US006944755B2

(12) United States Patent
Gur et al.

(10) Patent No.: US 6,944,755 B2
(45) Date of Patent: Sep. 13, 2005

(54) METHOD AND APPARATUS FOR EXTRACTING A PORTION OF DATA IN A SOURCE REGISTER AND ARRANGING IT ON ONE SIDE OF A DESTINATION REGISTER

(75) Inventors: Amit Gur, Even-Yehuda (IL); Haim Rizi, Jerusalem (IL); Dror Halahmi, Tel-Aviv (IL)

(73) Assignee: Freescale Semiconductor, Inc., Austin, TX (US)

( * ) Notice: Subject to any disclaimer, the term of this patent is extended or adjusted under 35 U.S.C. 154(b) by 874 days.

(21) Appl. No.: 09/910,554

(22) Filed: Jul. 20, 2001

(65) Prior Publication Data

US 2004/0014427 A1 Jan. 22, 2004

(51) Int. Cl.[7] .................................... G06F 15/00
(52) U.S. Cl. .................................... 712/300
(58) Field of Search .................... 712/221, 222, 712/300, 224, 225

(56) References Cited

U.S. PATENT DOCUMENTS 4,472,788 A * 9/1984 Yamazaki .................. 708/209
6,760,837 B1 * 7/2004 Laurenti et al. ............ 712/300
2002/0161785 A1 * 10/2002 Dagan et al. ............... 707/200

OTHER PUBLICATIONS

"TMS320C64x Technical Overview," Texas Instruments Incorporated, pp. iii–v, 1–3 to 1–9, 2–1 to 2–21, A–1 to A–5, B–1 to B–5, C–1 to C–3, D–1 to D–2 (2000).

* cited by examiner

*Primary Examiner*—Eddie Chan
*Assistant Examiner*—Brett Buehl
(74) *Attorney, Agent, or Firm*—James L. Clingan, Jr.

(57) ABSTRACT

A circuit selectively extracts bits from different locations from a source register and loads them in logical order in one side of a destination register. The register is divided into subsets. All of the transfer bits in each subset are arranged on one side and in logical order. These subsets are paired. The bits from one pair are shifted by an amount equal to the non-transfer bits from the other pair and then combined with the bits from the other pair to form a new group of bits that are on one side and are in logical order. The process of shifting bits of one of a pair of groups and combining with the other of the pair continues until all of the transfer bits from the source register are in one group on one side and in logical order.

6 Claims, 2 Drawing Sheets

METHOD AND APPARATUS FOR EXTRACTING A PORTION OF DATA IN A SOURCE REGISTER AND ARRANGING IT ON ONE SIDE OF A DESTINATION REGISTER

FIELD OF THE INVENTION

This invention relates to data processing, and more particularly to data transfers between registers.

BACKGROUND OF THE INVENTION

In the various data processing systems involving transmission of data, such as ADSL, wireless transmission, etc., there is a continuing need to provide error correction for noise that corrupts the data. The noise is often concentrated at a specific point in time so that the data that is corrupted may destroy too much information to be recovered by error correction. Error correction in part relies on having enough good data to be able to make a good estimate as to what the corrupted data actually was. If too much consecutive data is corrupted, there may not be enough good data to form a basis for making the desired error correction. Thus, one of the techniques to avoid a noise spike from creating this problem is to transmit the data in a different sequence and then re-creating the data at the receiving end. One common technique for doing this is called bit interleaving. In such case, alternate bits are transmitted, i.e., all of the even bits are transmitted then all of the odd bits are transmitted. At the receiving end the data is reconstructed by placing the data back in the regular order.

One of things then that is required is the ability to rearrange the data as needed. Typically, this is done with look-up tables or bit by bit mapping. Look-up tables require significant amounts of memory space. The memory space is a precious commodity in a processor such as a DSP for example. There are techniques for reducing the space required of the memory to achieve the look-up capability, but at the disadvantage of reduced speed. The alternative of bit by bit mapping is quite slow and occupies processing capability.

Accordingly, there is a need to be able to rearrange data quickly and with relatively small amount of space.

BRIEF DESCRIPTION OF THE DRAWINGS

Shown in FIG. 1 is a block diagram of a circuit for transferring data from a source register to a destination register according to an embodiment of the invention;

Shown in FIG. 2 is a first portion of the circuit of FIG. 1; and

Figure 1:
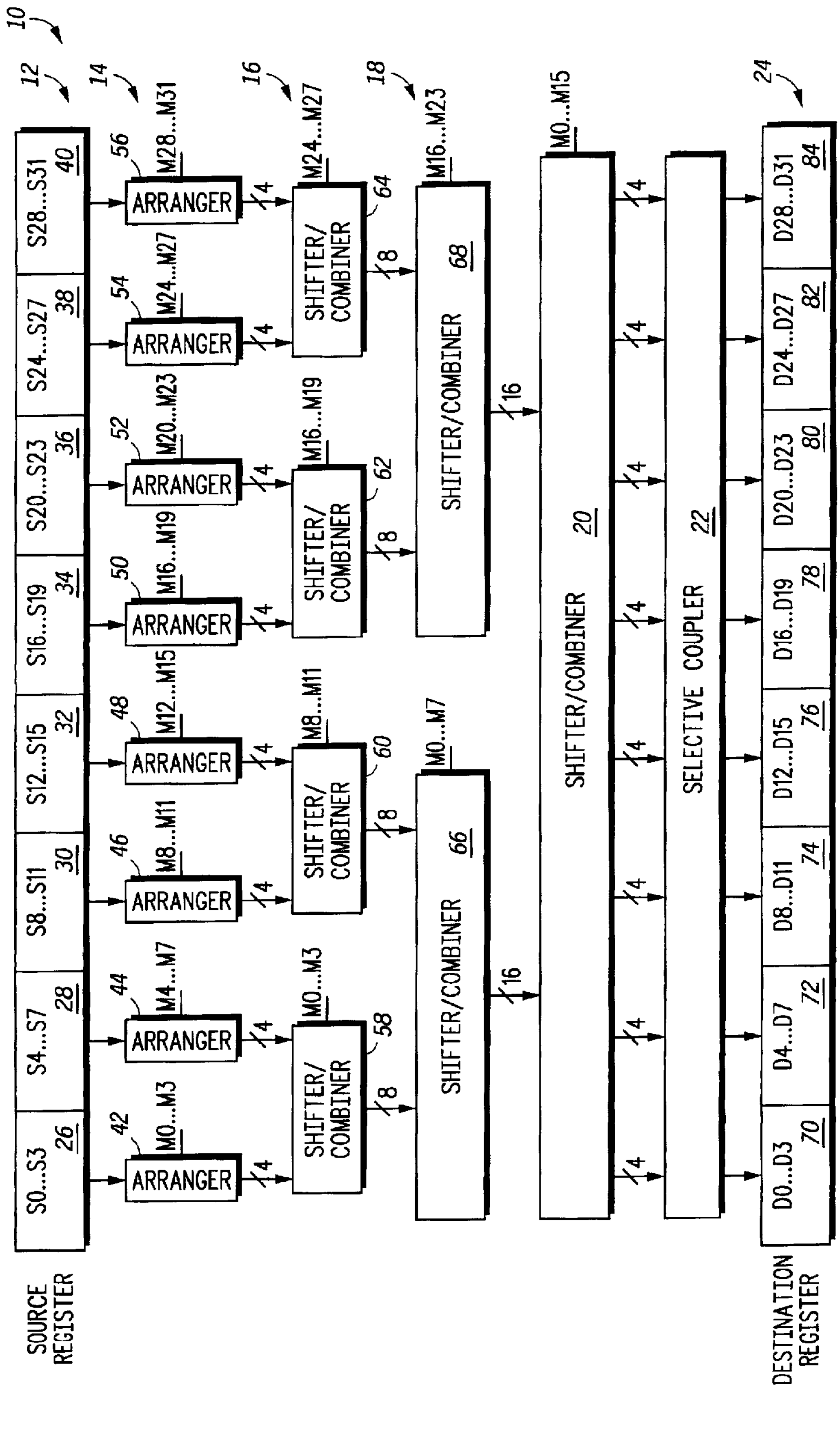
Figure 3:
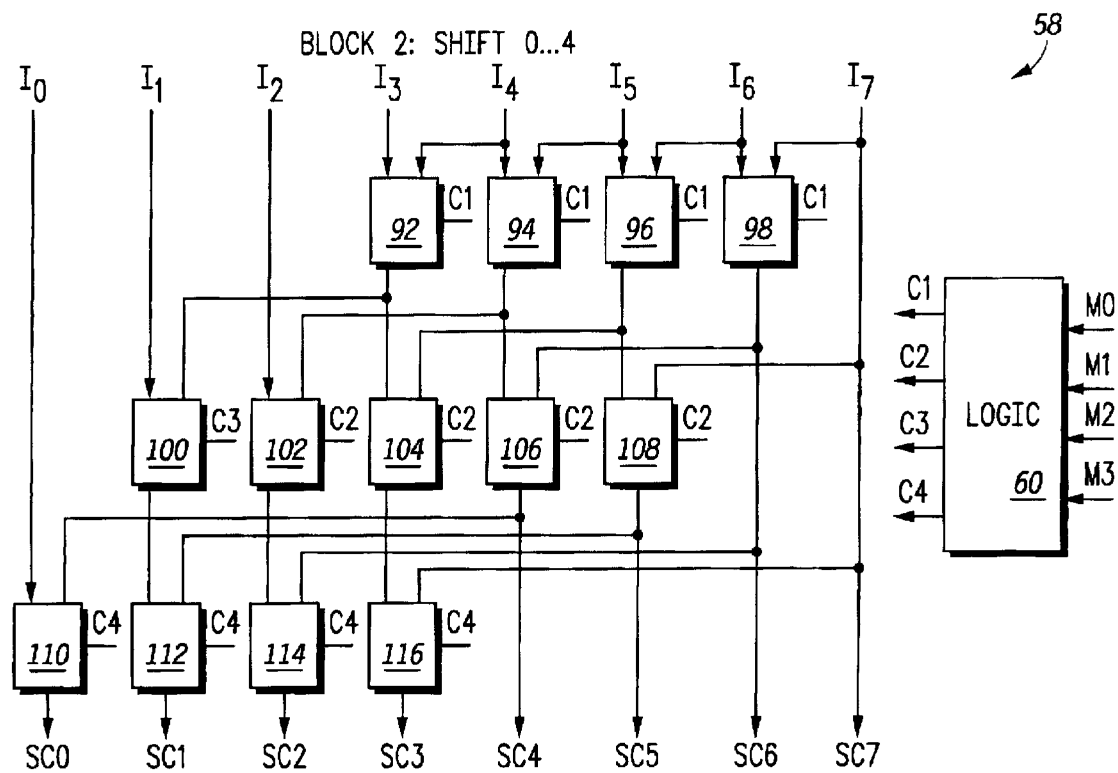

Shown in FIG. 3 is a second portion of the circuit of FIG. 1.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DESCRIPTION OF THE INVENTION

Described herein is a technique which provides a way to transfer data in typical desirable arrangements by having arrangers and shifter/combiners. The result is relatively small amount of space required and high speed operation.

Shown in FIG. 1 is a bit manipulation unit 10 comprising a source register 12, arranger logic 14, shifter/combiner logic 16, shifter/combiner logic 18; a shifter/combiner 20, a selective coupler 22, and a destination register 24. Source register 12 comprises 32 bits made up of eight subsets. The eight subsets comprise subset 26, 28, 30, 32, 34, 36, 38, and 40, having source bits S0–S3, S4–S7, S8–S11, S12–S15, S16–S19, S20–S23, S24–S27, and S28–31, respectively. This is an example of how this can be done with a 32 bit word and other word lengths can be used as well. Arranger logic 14 comprises arrangers 42, 44, 46, 48, 50, 52, 54, and 56 coupled to subsets 26–40, respectively. Shifter/combiner logic 16 comprises shifter/combiners 58, 60, 62, and 64. Shifter/combiner 58 is coupled to a pair of arrangers 42 and 44, shifter/combiner 60 to pair of arrangers 46 and 48, shifter/combiner 62 to pair of arrangers 50 and 52, and shifter/combiner 64 to pair of arrangers 54 and 56. Shifter/combiner logic 18 comprises shifter/combiners 66 and 68. Shifter combiner 66 is coupled to shifter/combiners 58 and 60. Shifter/combiner 68 is coupled to shifter/combiners 62 and 64. Shifter/combiner logic 20 is coupled to shifter/combiners 66 and 68. Selective coupler 22 is coupled to shifter/combiner 20. Destination register 24 is coupled to selective coupler 22. The various elements are coupled by buses shown in FIG. 1 with a diagonal line through them and a number along side. The number indicates the number of bits in the bus.

In operation, source register 12 receives a data packet comprised of 32 bits. This may be video information in an ADSL system or some other data. The data is divided into four bit subsets designated as subsets 26–40. Each subset contains data that is to be transferred (transfer bits) to destination register 24 and some data that is not to be transferred (non-transfer bits). Each subset 26–40 couples its four bits to its corresponding arranger 42–56. Each arranger arranges the four bits so that the bits to be transferred are coupled to one side of the subset, in this case, the left side. In this context a container of data bits has bit positions that are designated as having a logic order in which the least significant bit is designated with a "0" according to the little endian format. The most significant bit has the highest number associated with it. Thus the signals originate with a number designation in the source register according to the location in the source register. They begin in logic order in that they are arranged from the lowest number to the highest number. In this case, the least significant bit, the one designated with a "0" is to the left as shown in the diagram. Left or right, however, is not necessarily a physical concept but a logic one. When reduced to a diagram, bit locations may conveniently be shown as being from left to right. So each subset 42–56 and each shifter/combiner 58–68 and 20 have a left side that begins the sequence of the data. The determination of which bits are to transferred and which ones that are not to be transferred is provided by a user selectable mask that has 32 bits M0–M31, one corresponding to each of the 32 bits of source register 12. If a mask bit is active, it means that its corresponding bit in source register 12 is to be transferred, which thus designates the bit as a transfer bit. If the mask bit is inactive, its corresponding bit in source register 12 is not to be transferred, its designated a non-transfer bit. The mask bits M0–M31 may be supplied from another register, not shown, or from another source. Thus, the arrangers 42–56 respond to bits M0–M31 by causing the transfer bits to be arranged in consecutive order (logic order) beginning with the left side. Each subset may have any number, up to four, of transfer or non-transfer bits.

Shifter combiners 58–64 each combine the contents of the pair of arrangers 42–56 to which they are coupled by adding the contents of the right most of the pair to the left side as far as the left most of the pair had non-transfer bits. For example, shifter/combiner 58 is coupled to arranger 42 and 44. Arranger 42 is the left most of the pair and arranger 44 is the right most of the pair. Arranger 42 may have some number of non-transfer bits. Whatever that number is is how far the contents of arranger 44 are shifted to the left and combined with arranger 42. The result is that all of the transfer bits from subsets 26 and 28 are adjacent to each other, beginning on the left side, and are in logic order in shifter/combiner 58. Thus, each of shifter/combiners 58–64 contain the transfer bits from their corresponding subsets on the left side and in logic order.

Shifter/combiners 66 and 68 perform a similar function to that of shifter/combiners 58–64. They are each combine the contents of the pair of shifter combiners 58–64 to which they are coupled by adding the contents of the right most of the pair to the left side as far as the left most of the pair had non-transfer bits. For example, shifter/combiner 66 is coupled to shifter/combiners 58 and 60. The left of these is shifter/combiner 58 and it may have some non-transfer bits. Ever how many there are, that is the amount that the bits from shifter/combiner 60 are shifted to the left and combined with the bits of shifter combiner 58. The results is that shifter/combiner 66 is loaded with the transfer bits from subsets 26–32, beginning with the left side and in logic order. Shifter/combiner has the transfer bits from subsets 34–40 also beginning at the left side and in logic order.

Shifter combiner 20 operates in the same manner as the other shifter combiners 58–68. The contents of shifter combiner 68 are left shifted by the amount of the non-transfer bits present in shifter/combiner 66, which is the same as number of non-transfer bits present in subsets 26–32, and then combined with the contents of shifter combiner 66. The result then is that all of the transfer bits begin on the left side and are in logic order. There are no spaces between the transfer bits. Selective coupler 22 then shifts the contents of shifter/combiner 20 directly into the corresponding locations in the destination register if selected for transfer. The transfer bits are on the left side and in logic order and would normally all be loaded but not necessarily. This technique for transferring effectively removes all of the non-transfer bits from among the transfer bits, regardless of the pattern, and delivers them in position to be transferred to the destination register on the left side and in logic order. One of the common cases is to have alternating transfer bits and non-transfer bits. The result in such a case is that shifter/combiner 20 would have transfer bits corresponding to destination bits D0–D15 loaded and ready to transfer via selective coupler 22. Other patterns are just as easily achieved. This provides a general solution for any pattern, not just an alternating pattern, of non-transfer bits for providing transfer bits, for example blocks of bits, in logic order to the destination register 24.

Selective coupler 22, in addition to being able to couple data from shifter/combiner 20 to destination register 24, can write a zero or one into any location of destination register 24 and also can write the previous value of any location in destination register 24 back into that location. This capability allows for signed operations as well as unsigned operations. Bit manipulation unit 10 can thus perform sign extend or zero extend. This is also useful in achieving the typical functions present in a DSP of bit mask set, clear, and change. Also shifts are sometimes used to multiply or divide by powers of 2 that can be achieved with circuit 10. In effect a block shift in the direction toward the most significant bit is a multiply by a power of two based on the amount of shift. Similarly, a shift in the direction toward the least significant bit is a divide by a power of two based on the amount of shift. In the example described for bit manipulation unit 10, the shift toward the left is a divide. A reverse process is also available which can provide a shift in the opposite direction can provide the shift toward the most significant bit, the right in this case, which results in a multiply. Another capability of selective coupler 22 is to provide an AND or OR function between any bits present in shifter/combiner 20 and an immediate number.

Essentially the same process, but in reverse, can be used for insertion of transfer bits. The process is a two step process of loading the bits that begin on the far the left side and spread over more bit locations. Then the second step is to do load the same register with the same process into the locations. In the first step, the empty locations are analogous to the non-transfer bits. In the second step, the already loaded bits are analogous to the non-transfer bits. Similarly a mask would define which were the transfer bits and the non-transfer bits. The mask for step 2 would functionally be the complement to that used for step one. There would be no need for an additional mask. Thus to explain step one, of interleaving or insertion process, reference can be made to FIG. 1.

The elements of FIG. 1 when referenced in this context are being considered as being modified as necessary to achieve the needed result of insertion and will be designated with a prime ('). The bits to be inserted are coupled from destination register 24' to shifter combiner 20' via selective coupler 22'. Shifter/combiner 20' would be more appropriately called a shifter/separator 20' and would send to the right side, to shifter/separator 68', the bits that were designated as being transfer bits in the amount equal to the number of non-transfer bits present in subsets 26–32. Similarly, shifter/separators 66' and 68' split out the transfer bits to the right the number of bits equal to the non-transfer bits on the left side. The number of bits transferred to shifter/separator 60' would be equal to the number of non-transfer bits present in subsets 26' and 28'. Shifter/separators 58'–64' similarly send to the right side the number of non-transfer bits on the left side. Thus, shifter/separator 58 would send the number of bits to the right, to arranger 44', the number of non-transfer bits present in subset 26'. Arrangers 42'–56' would thus have the bits in the left most position in logic order for proper placement in subsets 26–32. This is only a four bit arrangement required for each of arrangers 42'–56'. This would complete step one. Step two would be completed in the same way with the complementary locations for the transfer and non-transfer bits present in subsets 26–32.

Figure 2:
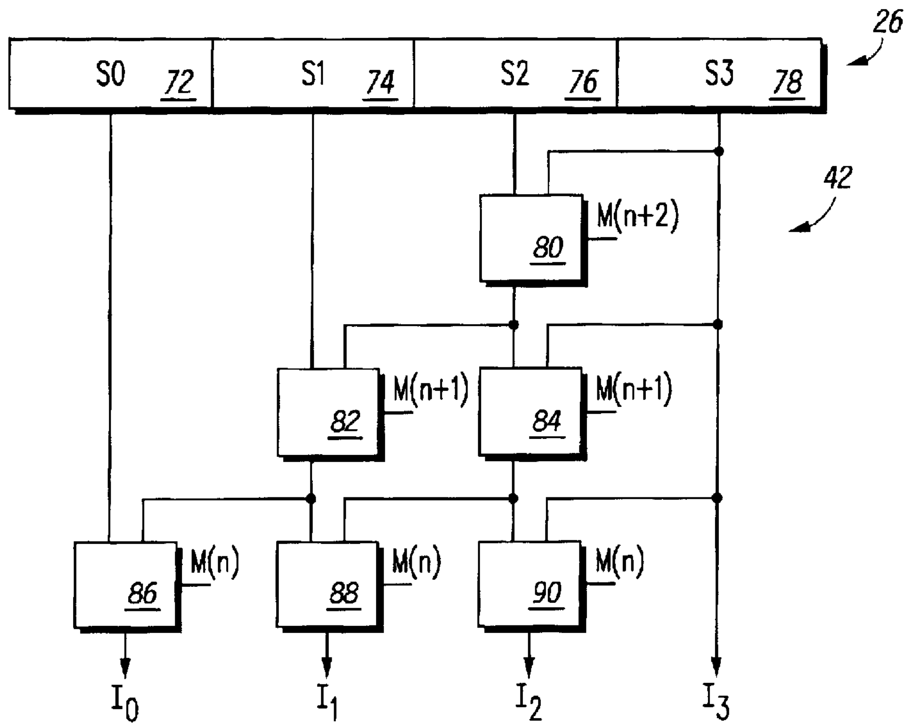

Shown in FIG. 2 is a arranger 42 and subset 26 shown in more detail. Subset 26 comprises bit locations S0, S1, S2, and S3. Arranger 42 comprises two input multiplexers 80, 82, 84, 86, 88, and 90 that are selected by mask signals M(n), M(n+1), and M(n+2) based on the mask information. These are shown for the general case in which n refers to the subset location. In this particular example, the subset is 26 so n=0. Thus the signals are M0, M1, and M2 and when active indicate that the corresponding bit locations, S0, S1, and S2, respectively are transfer locations. Signal S3 is not necessary at this stage. The S3 location always transfers whether it is a transfer location or not. The purpose of arranger 42 is simply to ensure that the transfer locations are placed in the far left side and they will be in logic order.

Multiplexer 80 has an input coupled to S2, an input coupled to S3, a control input for receiving M2, and an output. Multiplexer 82 has an input coupled to S1, an input coupled to the output of multiplexer 80, and an output. Multiplexer 84 has an input coupled to the output of multiplexer 80, an input coupled to S3, and an output. Multiplexer 86 has an input coupled to S0, an input coupled to the output of multiplexer 82, and an output for providing an intermediate signal I0. Multiplexer 88 has an input coupled to the output of multiplexer 82, an input coupled to the output of multiplexer 84, and an output for providing intermediate signal I1. Multiplexer 90 has an input coupled to the output of multiplexer 84, an input coupled to S3, and an output for providing an intermediate signal I2. S3 provides intermediate signal I3. Multiplexers 82 and 84 each have their control input for receiving M1. Multiplexers 86–90 each have their control input for receiving M0. Multiplexers 80–90 each pass their left most input when its control input is active and their right most input when its control input is inactive.

In operation, arranger 42 pushes all of the transfer bits from subset 26 to the left side so that they are in logic order. As an example, if S0–S2 were non-transfer bits, S3 would be coupled out as intermediate signal I0. In such case M0–M2 would be inactive so that S3 would couple through multiplexer 80 to multiplexer 82 where it would be passed to multiplexer 86 where it would be passed as intermediate signal I0. In such case intermediate signals I1–I3 are irrelevant because there is only bit that is a transfer bit for subset 26 and it is in the left most position as signal I3.

As another example, if S0 and S2 are non-transfer bits and S1 and S3 are transfer bits, M0 and M2 are inactive and M1 is active. Multiplexer 80 will pass S3, the right most input, to multiplexers 82 and 84 with M2 inactive. With M1 being active, multiplexers 82 and 84 will pass their left most input so that S1 is passed by multiplexer 82 and the output of multiplexer 80, S3, will be passed by multiplexer 84. Multiplexers 86–90 will each pass their right most input with M0 being inactive so that multiplexer 86 will pass the output of multiplexer 82, S1; multiplexer 88 will pass the output of multiplexer 84, S3, and multiplexer 90 will pass S3. In this example, there are two transfer bits, S1 and S3, and they are provided as intermediate signals I0 and I1, the left most bits and in logic order. Since there are only two transfer bits in this example, intermediate signals I2 and I3 are irrelevant because those bit locations, which at this stage correspond to bit locations D2 and D3, will not be ultimately written into D2 and D3 but will be written over in subsequent stages if those bit locations are to have valid data in the ultimate loading of destination register 24. Arrangers 42–56 take the transfer bits, regardless of the pattern they are in, and transfer them to their corresponding shifter/combiner 58–64 as the left most bits and in logic order.

Shown in FIG. 3 is a detailed block diagram of shifter/combiner 58, which comprises logic 91 and two-input multiplexers 92, 94, 96, 98, 100, 102, 104, 106, 108, 110, 112, 114, and 116 and operate in the same way as multiplexer, 80–90 shown in FIG. 2. Shifter/combiner 58 receives intermediate signals I0–I3 as described with regard to FIG. 2 and also intermediate signals I4–I7 from arranger 44 that arc generated in the same manner as intermediate signals I0–I3. Multiplexer 92 has an input for receiving signal I3, and input for receiving signal I4, and an output. Multiplexer 92 has an input for receiving signal I3, an input for receiving signal I4, and an output. Multiplexer 92 has an input for receiving signal I4, an input for receiving signal I5, and an output. Multiplexer 96 has an input for receiving signal I5, an input for receiving signal I6, and an output. Multiplexer 98 has an input for receiving signal I6, an input for receiving signal I7, and an output for providing shifter/combiner signal SC6. Multiplexer 100 has an input for receiving signal I1, an input coupled to the output of multiplexer 92, and an output. Multiplexer 102 has an input for receiving signal I2, an input coupled to the output of multiplexer 94, and an output. Multiplexer 104 has an input coupled to the output of multiplexer 92, an input coupled to the output of multiplexer 96, and an output. Multiplexer 106 has an input coupled to the output of multiplexer 94, an input coupled to the output of multiplexer 98, and an output for providing shifter/combiner signal SC4. Multiplexer 108 has an input coupled to the output of multiplexer 96, an input for receiving signal I7, and an output for providing shifter/combiner signal SC5. Multiplexer 110 has an input for receiving signal I0, an input coupled to the output of multiplexer 106, and an output for providing shifter/combiner signal SC0. Multiplexer 112 has an input coupled to the output of multiplexer 100, an input coupled to the output of multiplexer 108, and an output for providing shifter/combiner signal SC1. Multiplexer 114 has an input coupled to the output of multiplexer 102, an input coupled to the output of multiplexer 98, and an output for providing shifter/combiner signal SC2. Multiplexer 116 has an input coupled to the output of multiplexer 104, an input for receiving signal SC7, and an output for providing shifter/combiner signal SC3. Signal I7 is passed as shifter/combiner signal SC7.

Logic 91 converts mask signals M0–M3 to shift control signals C1, C2, C3, and C4. Although arranger 42 does not use mask signal M3, logic 91 does. Signals C1–C4 provide the information as to the amount of shift that is to occur. The information and the circuit of shift/combiner 58 allow for a shift of anywhere from zero to seven. Mask signals provide the information as to how many of the four possible bits are non-transfer bits. The logic thus provides shift control signals in the logic states that represents how many non-transfer bits were in the left most subset of the pair of subsets. In this case, the relevant subset is subset 26. The maximum number that can be non-transfer bits is four so the actual maximum shift is four. Multiplexers 92–98 each have their control input for receiving shifter control signal C1. Multiplexers 102–108 each have their control input for receiving shifter control signal C2. Multiplexer 100 has its control input for receiving shifter control signal C3. Multiplexers 110–116 each have their control input for receiving shifter control signal C4. When signals C1–C4 are all active, that means no shift. When signal C1 is inactive, there is a shift of 1. When signal C2 is inactive, there is a shift of 2. When signal C3 is active, there is a shift of three. When signal C4 is inactive, there is a shift of four. When C2 and C1 are inactive there is a shift of three. Thus, there is available a shift of zero to four. The cases for 5–7 are also available but are not necessary. Shifter/combiners 58–64 are all constructed in the same way.

Using a shift of three as an example for the case when only signal I0 is to pass, then signal multiplexer 110 should pass I0 as signal SC0 and signals I4–I7 should pass as signals SC0–SC5. In such case signals SC5–SC7 do not matter because at least they correspond to non-transfer bits. In the this three shift case, signals C1, C2, and C3 are inactive. Multiplexers 92–108 thus pass their right most input. Thus signals I4–I7 are passed to the right inputs of multiplexers 100–106, which in turn pass them to the left inputs of multiplexers 112–116. Signal C4 is active so that the left inputs are passed. The result is as desired; signals I0 and I4–I7 are passed as signals SC0–SC5.

For the case of a shift of two, signal C2 is inactive so that multiplexers 102–108 pass their right input. Multiplexer 100 passes its left input, which is signal I1. Signals I4–I7 then pass through to multiplexers 102–108, respectively. Multiplexers 106 and 108 pass them through as signals SC4 and SC5. Multiplexers 114 and 116 pass the outputs of multiplexers 102 and 104 as signals SC2 and SC3. Multiplexer 100 passes signal I1 to multiplexer 112 which passes it as signal SC1. Multiplexer 110 passes signal I0. Thus the desired result of signals I0, I1 and I4–I7 pass as signals SC0–SC5 is achieved.

Shifter/combiners 66, 68, and 20 are constructed in a similar fashion and achieve the similar result. The desired result of having the transfer bits placed in destination register is thus achieved. Shifter/combiners 58 and 42 can be easily be altered slightly to be achieve the function described for shifter/separators 58' and 42'.

Thus, it is seen that bit manipulation unit 10 can perform the useful insertions and extractions while also achieving a number of desirable standard functions such as logical and arithmetic shift left and shift right; bit mask set, clear, and change; logical OR or AND between with an immediate value; and sign extend or zero extend.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A circuit comprising:

a source register with the plurality of bits divided into a plurality of first level subsets;

means for identifying the bits in each subset which are transfer bits and non-transfer bits;

arranger means for aligning the transfer data bits in each first level subset to a first side thereof to farm corresponding second level subsets of the transfer data bits;

a destination register; and coupling means for loading the transfer data bits from the second level subsets into the destination register aligned to the first side of the destination resister;

wherein the arranger means comprises a plurality of arrangers each for a receiving a set of mask bits, each set of mask bits corresponding to one of the arrangers, each arranger corresponding to a subset of the first level subsets, each arranger comprising:

a first multiplexer having a first input coupled to receive a first bit from the subset of the first level subsets to which the arranger corresponds, a second input coupled to receive a second bit from the subset of the first level subsets to which the arranger corresponds, a control input for receiving a first mask bit from the set of mask bits to which thee arranger corresponds, and an output;

a second multiplexer having a first input to receive the first bit, a second input coupled to the output of the first multiplexer, a control input for receiving a second mask bit from the set of mask bits to which the arranger corresponds, and an output;

a third multiplexer having a first input coupled to the output of the first multiplexer, a second input coupled a third bit from the subset of the first level subsets to which the arranger corresponds, a control input for receiving the second mask bit, and an output;

a fourth multiplexer having a first input coupled to the output of the third multiplexer, a second input coupled a fourth bit front the subset or the first level subsets to which the arranger corresponds, a control input for receiving a third mask bit from the set of mask bits to which the arranger corresponds, and an output as a first output of the arranger;

a fifth multiplexer having a first input coupled to the output of the third multiplexer, a second input coupled to the output of the second multiplexer, a control input for receiving the third mask bit, and an output as a second output of the arranger; and a sixth multiplexer having a first input coupled to the output of the second multiplexer, a second input coupled to receive the first bit, a control input for receiving the third mask bit, and an output as a third output of the arranger.

2. The circuit of claim 1 further comprising a combiner means for combining pairs of the second level subsets, each pair comprising a first of the pair and a second of the pair, by shifting the transfer data bits of the first of the pairs to form shifted transfer bite and combining said shifted transfer bits with the second of the pairs.

3. The circuit of claim 2, wherein each combiner means comprises:

a first plurality of multiplexers coupled to the first of the pair and a first mask signal;

a second plurality of multiplexer, coupled to the first plurality of multiplexers and a second mask signal; and a third plurality of multiplexer, coupled to the second plurality of multiplexers and a third mask signal.

4. A circuit, comprising:

a source register having a plurality of bits and for containing transfer and non-transfer data contained in first and second subsets of the plurality of bits;

a destination register;

a first arrangement means coupled to the first subset for placing the transfer bits contained in the first subset on a first side of the first arrangement means;

a second arrangement means coupled to the second subset for placing the transfer bits contained in the second subset on the first side of the first arrangement means;

shifter/combiner means for shifting the data in the second arrangement means toward the first side of the shifter/combiner means by an amount equal to the number of non-transfer bits in the first subset; and coupling means for coupling the contents of the first and second means into the destination register;

wherein the first arrangement means comprises:

a first multiplexer having a first input coupled to receive a first bit from the first subset, a second input coupled to receive a second bit from the first subset, a control input for receiving a first mask bit, and an output;

a second multiplexer having a first input to receive the first bit, a second input coupled to the output of the first multiplexer, a control input for receiving a second mask bit, and an output;

a third multiplexer having a first input coupled to the output of the first multiplexer, a second input coupled a third bit from the first subset, a control input for receiving the second mask bit, and an output;

a fourth multiplexer having a first input coupled to the output of the third multiplexer,a second input coupled a fourth bit from the first subset, a control input for receiving a third mask, and an output as a first output of the first arrangement means;

a fifth multiplexer having a first input coupled to the output of the third multiplexer, a second input coupled to the output of the second multiplexer, a control input for receiving the third mask bit, and an output as a second output of the arrangement means; and a sixth multiplexer having a first input coupled to the output of the second multiplexer, a second input coupled to receive the first bit, a control input for receiving the third mask bit, and an output as a third output of the arrangement means.

5. The circuit of claim 4, wherein the coupling means is further characterized as coupling the contents of the first and second means into the first side of the destination register.

6. The circuit of claim 4, wherein the shifter/combiner means comprises:

a first plurality of multiplexers coupled to the second arrangement means and a first mask signal;

a second plurality of multiplexers coupled to the first plurality of multiplexers and a second mask signal; and a third plurality of multiplexers coupled to the second plurality of multiplexers and a third mask signal.

* * * * *